US006777384B2

(12) United States Patent
Raths et al.

(10) Patent No.: US 6,777,384 B2
(45) Date of Patent: Aug. 17, 2004

(54) GEMINI SURFACTANTS

(75) Inventors: Hans-Christian Raths, Monheim (DE); Manfred Weuthen, Langenfeld (DE); Michael Elsner, Heiligenhaus (DE)

(73) Assignee: Cognis Deutschland GmbH & Co., KG, Duesseldorf (DE)

( * ) Notice: Subject to any disclaimer, the term of this patent is extended or adjusted under 35 U.S.C. 154(b) by 0 days.

(21) Appl. No.: 10/140,146

(22) Filed: May 6, 2002

(65) Prior Publication Data

US 2003/0008801 A1 Jan. 9, 2003

(30) Foreign Application Priority Data

May 4, 2001 (DE) .......................................... 101 21 723

(51) Int. Cl.$^7$ .............................. C11D 1/68; C11D 3/20; C11D 3/37; B08B 3/04
(52) U.S. Cl. ....................... 510/475; 510/220; 510/356; 510/360; 510/413; 510/421; 510/470; 510/505; 510/506; 510/521; 510/524; 510/535; 568/613; 568/622; 523/400; 523/406; 134/25.2; 134/25.3; 134/39; 134/40; 134/42
(58) Field of Search ................................ 510/220, 356, 510/360, 413, 421, 470, 475, 505, 506, 521, 524, 535; 568/613, 622; 523/400, 406; 134/25.2, 25.3, 38, 40, 42

(56) References Cited

U.S. PATENT DOCUMENTS

| | | | |
|---|---|---|---|
| 5,312,932 A | 5/1994 | Behler et al. ................. 554/90 |
| 5,322,957 A | 6/1994 | Fabry et al. .................. 558/23 |
| 5,484,531 A | 1/1996 | Kuehne et al. ............. 210/653 |
| 5,759,987 A | 6/1998 | Haerer et al. ................ 510/514 |
| 2003/0008801 A1 * | 1/2003 | Raths et al. ................. 510/421 |
| 2003/0036496 A1 * | 2/2003 | Elsner et al. ................ 510/421 |
| 2003/0078176 A1 * | 4/2003 | Elsner et al. ................ 510/220 |
| 2003/0078182 A1 * | 4/2003 | Kischkel et al. ............ 510/421 |
| 2003/0114348 A1 * | 6/2003 | Kischkel et al. ............ 510/446 |
| 2003/0119703 A1 * | 6/2003 | Elsner et al. ................ 510/421 |

FOREIGN PATENT DOCUMENTS

| | | | | |
|---|---|---|---|---|
| DE | 42 04 700 A1 | | 8/1993 | ........... B01D/61/14 |
| DE | 4321022 | * | 1/1995 | ......... C07C/303/24 |
| DE | 43 23 252 A1 | | 1/1995 | ........... C11D/1/825 |
| DE | 10121722 | * | 11/2002 | ........... C11D/1/825 |
| DE | 10121724 | * | 11/2002 | ........... C11D/1/825 |
| DE | 10137925 | * | 2/2003 | ........... C08L/29/02 |
| DE | 10152142 | * | 4/2003 | ........... C11D/17/00 |
| EP | 0 561 825 B1 | | 9/1995 | ......... C07C/305/10 |
| EP | 0 561 999 B1 | | 1/1996 | ......... C07C/305/10 |
| GB | 1543992 | * | 4/1979 | ............ C08K/5/05 |

OTHER PUBLICATIONS

Biswas, et al., "Surface–Active Properties of Sodium Salts of Sulfated Fatty Acid Monoglycerides", The Journal Of The American Oil Chemists' Society, vol. 37, (Apr., 1960), pp. 171–175.

Ahmed, "Efficient Synthesis of Fatty Monoglyceride Sulfates from Fatty Acids and Fatty Acid Methyl Esters", JAOCS, vol. 67, No. 1, (Jan., 1990), pp. 8–14.

* cited by examiner

Primary Examiner—Brian P Mruk
(74) Attorney, Agent, or Firm—John E. Drach; Steven J. Trzaska

(57) ABSTRACT

The invention relates to gemini surfactants, optionally in combination with ingredients customary in laundry detergents, dishwashing detergents and cleaners, optionally with further nonionic surfactants and anionic surfactants, and to the use of such gemini surfactants for improving the wetting behavior and the compatibility with plastics, for the simplified preparation of solid cleaners and as foam-suppressing surfactant in rinse aid formulations.

18 Claims, No Drawings

GEMINI SURFACTANTS

BACKGROUND OF THE INVENTION

The invention relates to gemini surfactants, optionally in combination with ingredients customary in laundry detergents, dishwashing detergents and cleaners, optionally with further nonionic surfactants and anionic surfactants, and to the use of such gemini surfactants for improving the wetting behavior and compatibility with plastics, for the simplified preparation of solid cleaners and as foam-suppressing surfactant in rinse aid formulations.

Compositions for the washing and cleaning of hard non-textile surfaces which are intended for the household and industrial sector, which mostly develop, upon use, a small volume of foam which further decreases significantly within a few minutes. Compositions of this type have been known for a long time and are established in the market. These are essentially aqueous surfactant solutions of varying type with or without the addition of builders, solubility promoters (hydrotropic agents) or solvents. However, to demonstrate the effectiveness, a certain foaming of the application solution at the start of the cleaning operation is desired by the consumer, although the foam should rapidly collapse so that surfaces which have been cleaned once do not have to be wiped again. For this purpose, low-foaming nonionic surfactants are usually added to compositions of said type.

Nowadays, higher requirements are placed on dishes washed by machine than on dishes washed manually. For example, an item of tableware which has been completely cleaned of food residues is not assessed as perfect if, after the machine dishwashing, it still has whitish marks based on water hardness or other mineral salts which, for a lack of wetting agents, originate from dried-up water drops.

In order to obtain gleaming and spotless tableware, a rinse aid is therefore used. The addition of a liquid or solid rinse aid, which may be added separately or is already in ready-to-use presentation form with the detergent and/or regenerating salt ("2 in 1", "3 in 1", e.g. in the form of tabs and powders), ensures that the water runs off as completely as possible from the ware, so that the various surfaces are residue-free and gleaming at the end of the wash program.

Commercially available rinse aids are mixtures of, for example, nonionic surfactants, solubility promoters, organic acids and solvents, water and optionally preservatives and fragrances. The aim of the surfactants in these compositions is to influence the interfacial tension of the water so that it can run off from the wear in the thinnest possible coherent film so that, during the subsequent drying operation, no water drops, streaks or films remain (wetting action or wetting behavior).

For this reason, surfactants in rinse aids must also suppress the foam which arises as a result of food residues in the dishwashing machine. Since most rinse aids comprise acids to improve the clear drying effect, the surfactants used must additionally be relatively hydrolysis-insensitive toward acids.

Rinse aids are used both domestically and in industrial sectors. In domestic dishwashers the rinse aid is mostly metered in after the prerinse and washing cycle at just under 40° C.–65° C. Industrial dishwashing machines operate with only one wash liquor which is only replaced by the addition of the rinse aid solution from the previous wash cycle. There is thus no complete water change during the entire wash program. For this reason, the rinse aid must also have a foam-suppressing action, be thermally stable at a sharp temperature gradient of 85–35° C. and, in addition, must be sufficiently stable toward alkali and active chlorine.

An object of the present invention was to provide laundry detergents, dishwashing detergents and cleaners which simultaneously exhibit good foaming behavior and cleaning behavior, but in particular very good run-off behavior, i.e. an improvement in the wetting behavior on plastic surfaces, and high material compatibility, in particular with plastics. In addition, the aim was to be able to prepare simplified solid cleaner formulations. The object was achieved by using selected surfactants of the gemini surfactant type.

DESCRIPTION OF THE INVENTION

The invention provides gemini surfactants of the formula (I)

$$X[-CH_2-CHOH-R]_n \qquad (I)$$

in which X is a polyol radical, R is a linear or branched alkyl and/or alkenyl radical having 4 to 22 carbon atoms and n is 2 to 8.

Gemini Surfactants

These gemini surfactants are prepared by reacting 1,2-epoxyalkanes (CH2CHO—R), where R is a linear or branched, saturated or unsaturated alkyl and/or alkenyl radical having 4 to 22 carbon atoms, preferably 6 to 16, in particular 8 to 12, carbon atoms, with polyols. The index n is 2 to 8 and indicates the number of hydroxyl groups from the polyol compound reacted with the epoxide.

In a preferred embodiment, X is a polyol radical chosen from the group formed by alkane polyols, alkene polyols and oxyalkylene polyols.

In the text below, polyol is used as the collective term for polyhydric alcohols or polyalkylene glycols, i.e. as an organic compound which contains at least two hydroxyl groups in the molecule. Polyether compounds are also to be understood as meaning reaction products of polyhydric alcohols with alkoxylation reagents such as ethylene oxide and propylene oxide.

The term polyol radical X is to be understood for the purposes of the application as the radical of the polyol used which remains following reaction with its hydroxyl groups and release of an H to the 1,2-epoxyalkane unit. In the case of the reaction of, for example, ethylene glycol (HO—CH$_2$CH$_2$—OH), with a 1,2-epoxyalkane, the polyol radical X is to be understood as meaning O—CH$_2$CH$_2$—O.

The polyols may be alkane polyols, alkene polyols and oxyalkylene polyols. Typical examples of alkane polyols are ethylene glycol, 1,2-propylene glycol, 1,3-propanediol, 1,2-butanediol, 1,3-butanediol, 1,4-butanediol, trimethylolpropane, pentaerythritol, glycerol, glucose etc. and sugar alcohols such as sorbitol and inositol.

Preference is given here to the reaction with trimetylolpropane, pentaerythritol and glycerol.

Typical examples of alkene polyols are 2-butene-1,4-diol, 2-hexene-1,4,6-triol and 4-octyne-1,2,7,8-tetrol.

Typical examples of oxyalkylene polyols are diethylene glycol, triethylene glycol, tetraethylene glycol and polyethylene glycol, and polyglycerol, dipropylene glycol and polypropylene glycol.

These also include polyalkylene glycols, i.e. polymers with terminal hydroxyl groups. These polymers can be in the form of block polymers constructed from ethylene oxide and propylene oxide. Particular preference is given to those polymers which contain "randomized" ethylene oxide and propylene oxide units, i.e. the prior mixing of the alkoxylation reagents gives polymers which have a randomized distribution of the alkylene units.

In addition, polymers prepared by ethoxylation and/or propoxylation, in any sequence, of alkane polyols can also act as polyols for the purposes of the invention. These polyols may thus be in the form of block polymers constructed from ethylene oxide and propylene oxide. It is likewise possible to use polyols in the form of polymers which contain ethylene oxide and propylene oxide units in randomized order.

Preference is given to gemini surfactants based on oxyalkylene polyols where X is an oxyalkylene polyol radical.

Particular preference is given here to gemini surfactants based on polyethylene glycols where X is a polyethylene glycol radical with a molar weight of from 200 to 75,000, preferably from 400 to 4000 and in particular from 600 to 2000, R is a linear or branched alkyl and/or alkenyl radical having 8 to 12 carbon atoms and n is 2.

Very particular preference is given to gemini surfactants of the formula (I) where X is a polyethylene glycol radical with a molecular weight of from 600 to 2000, R is a linear alkyl radical having 10 carbon atoms and n is 2.

In a further embodiment, preference is given to gemini surfactants of the formula (I) which are characterized in that they comprise at least 80% by weight, preferably 85 to 100% by weight, in particular 95 to 100% by weight, of gemini surfactants in which at least two of the hydroxyl groups from the polyol are capped with 1,2-epoxyalkane units.

In addition, in a further embodiment, laundry detergents, dishwashing detergents and cleaners are claimed which comprise the gemini surfactants according to the invention and further ingredients customary in laundry detergents, dishwashing detergents and cleaners. These customary ingredients can, as described below, be alkyl and/or alkenyl oligoglycosides, further nonionic surfactants, anionic surfactants, builders, enzymes and further auxiliaries and additives.

Very particular preference is given here to laundry detergents, dishwashing detergents and cleaners which comprise gemini surfactants of the formula (I) in which X is a polyethylene glycol radical with a molecular weight of from 400 to 4000, R is a linear or branched alkyl and/or alkenyl radical having 8 to 12 carbon atoms and n is 2.

Alkyl and/or Alkenyl Oligoglycosides

In a further embodiment, the laundry detergents, dishwashing detergents and cleaners according to the invention comprise alkyl and/or alkenyl oligoglycosides of the formula (II)

$$R^1O\text{---}[G]_p \qquad (II)$$

where $R^1$ is an alkyl and/or alkenyl radical having 4 to 22 carbon atoms, G is a sugar radical having 5 or 6 carbon atoms and p is a number from 1 to 10.

They can be obtained by the appropriate methods of preparative organic chemistry. The alkyl and/or alkenyl oligoglycosides can be derived from aldoses or ketoses having 5 or 6 carbon atoms, preferably glucose. The preferred alkyl and/or alkenyl oligoglycosides are thus alkyl and/or alkenyl oligoglucosides.

The alkyl radical $R^1$ can be derived from primary saturated alcohols. Typical examples are butanol-1, caproic, enanthic, caprylic, pelargonic, capric alcohol, undecanol-1, lauryl alcohol, tridecanol-1, myristyl alcohol, pentadecanol-1, cetyl alcohol, palmityl alcohol, heptadecanol-1, stearyl alcohol, isostearyl alcohol, nonadecanol-1, arachidyl alcohol, heneicosanol-1, and behenyl alcohol, and technical-grade mixtures thereof, as are obtained, for example, in the hydrogenation of technical-grade fatty acid methyl esters or in the course of the hydrogenation of aldehydes from the Roelen oxo synthesis.

The alkenyl radical $R^1$ can be derived from primary unsaturated alcohols. Typical examples of unsaturated alcohols are undecen-1-ol, oleyl alcohol, elaidyl alcohol, ricinol alcohol, linoleyl alcohol, linolenyl alcohol, gadoleyl alcohol, arachidonyl alcohol, eurucyl alcohol, brassidyl alcohol, palmoleyl alcohol, petroselinyl alcohol, arachyl alcohol, and technical-grade mixtures thereof which can be obtained as described above.

Preference is given to alkyl or alkenyl radical $R^1$ derived from primary alcohols having 6 to 16 carbon atoms.

Alkyl oligoglucosides of chain length $C_8$-$C_{10}$ which form as forerunnings in the fractional distillation of technical-grade $C_8$–$C_{18}$-coconut fatty alcohol and may be contaminated with a proportion of less than 6% by weight of $C_{12}$-alcohol, and also alkyl oligoglucosides based on technical-grade $C_{9/11}$-oxo alcohols are particularly suitable.

The alkyl or alkenyl radical $R^1$ can also be derived from primary alcohols having 12 to 14 carbon atoms.

The index p in the general formula (II) gives the degree of oligomerization (DP), i.e. the distribution of mono- and oligoglycosides and is a number between 1 and 10. While p in a given compound must always be a whole number and here, in particular, can assume the values p=1 to 3, the value p for a certain alkyl oligoglycoside is an analytically determined calculated parameter which in most cases is a fraction.

Preference is given to using alkyl and/or alkenyl oligoglycosides with an average degree of oligomerization p of from 1.1 to 2.0. From an applications view point, preference is given to both alkyl and/or alkenyl oligoglycosides whose degree of oligomerization is less than 2.0 and in particular is between 1.2 and 1.7.

Preference is given to using alkyl and/or alkenyl oligoglycosides of the formula (II), where p is a number from 1 to 3 and $R^1$ is an alkyl radical having 6 to 16 carbon atoms.

In a preferred embodiment, the laundry detergents, dishwashing detergents and cleaners according to the invention comprise 0.01 to 25% by weight, preferably 0.025 to 20% by weight and in particular 0.1 to 15% by weight of gemini surfactants of the formula (I), calculated as active substance, based on the compositions.

Active substance is defined here as the mass of surfactant (calculated as 100%-pure substance) which are present in the composition.

In a further embodiment, the laundry detergents, dishwashing detergents and cleaners according to the invention comprise 0.01 to 30% by weight, preferably 0.1 to 20% by weight and in particular 0.2 to 15% by weight of alkyl and/or alkenyl oligoglycosides of the formula (II), calculated as active substance, based on the compositions.

Nonionic Surfactants

The laundry detergents, dishwashing detergents and cleaners according to the invention can comprise further nonionic surfactants. Typical examples of nonionic surfactants are alkoxylates of alkanols, terminally capped alkoxylates of alkanols without free OH groups, alkoxylated fatty acid lower alkyl esters, amine oxides, alkylphenol polyglycol ethers, fatty acid polyglycol esters, fatty acid amide polyglycol ethers, fatty amine polyglycol ethers, alkoxylated triglycerides, mixed ethers or mixed formals, fatty acid N-alkylglucamides, protein hydrolysates (in particular plant products based on wheat), polyol fatty acid esters, sugar esters, sorbitan esters and polysorbates. If the nonionic surfactants contain polyglycol ether chains, these may have a conventional homolog distribution, but preferably have a narrowed homolog distribution.

Preference is given to the other nonionic surfactants chosen from the group formed by alkoxylates of alkanols, in particular fatty alcohol polyethylene glycol/polypropylene glycol ethers (FAEO/PO) of the formula (III) and fatty alcohol polypropylene glycol/polyethylene glycol ethers (FAPO/EO) of the formula (IV), terminally capped alkoxylates of alkanols, in particular terminally capped fatty alcohol polyethylene glycol/polypropylene glycol ethers or terminally capped fatty alcohol polypropylene glycol/polyethylene glycol ethers, and fatty acid lower alkyl esters and amine oxides.

Fatty Alcohol Polyethylene Glycol/polypropylene Glycol Ethers

In a preferred embodiment, use is made of fatty alcohol polyethylene glycol/polypropylene glycol ethers of the formula (III), which may be terminally capped,

$R^6O\,(CH_2CH_2O)_{n1}\,[CH_2(CH_3)\,CHO]_m R^7$ (III)

in which $R^6$ is an alkyl and/or alkenyl radical having 8 to 22 carbon atoms, $R^7$ is H or an alkyl radical having 1 to 8 carbon atoms, n1 is a number from 1 to 40, preferably 1 to 30, in particular 1 to 15, and m is 0 or a number from 1 to 10.

Fatty alcohol polypropylene glycol/polyethylene glycol ethers

Also suitable are fatty alcohol polypropylene glycol/polyethylene glycol ethers of the formula (IV) which may be terminally capped,

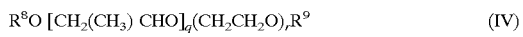

$R^8O\,[CH_2(CH_3)\,CHO]_q(CH_2CH_2O)_r R^9$ (IV)

in which $R^8$ is an alkyl and/or alkenyl radical having 8 to 22 carbon atoms, $R^9$ is H or an alkyl radical having 1 to 8 carbon atoms, q is a number from 1 to 5 and r is a number from 0 to 15.

According to a preferred embodiment, the laundry detergents, dishwashing detergents and cleaners according to the invention comprise fatty alcohol polyethylene glycol/polypropylene glycol ethers of the formula (III) in which $R^6$ is an aliphatic, saturated, straight-chain or branched alkyl radical having 8 to 16 carbon atoms, n1 is a number from 1 to 10, and m is 0 and $R^7$ is hydrogen. These are addition products of from 1 to 10 mol of ethylene oxide onto monofunctional alcohols. Suitable alcohols are the alcohols described above, such as fatty alcohols, oxo alcohols and Guerbet alcohols.

Of such alcohol ethyoxylates, those which have a narrowed homolog distribution are also suitable.

Further suitable representatives of non-terminally capped representatives are those of the formula (III) in which $R^6$ is an aliphatic, saturated, straight-chain or branched alkyl radical having 8 to 16 carbon atoms, n1 is a number from 2 to 7, m is a number from 3 to 7 and $R^7$ is hydrogen. These are addition products of monofunctional alcohols of the type already described alkoxylated firstly with 2 to 7 mol of ethylene oxide and then with 3 to 7 mol of propylene oxide.

The terminally capped compounds of the formula (III) are capped with an alkyl group having 1 to 8 carbon atoms ($R^7$). Such compounds are often also referred to in the literature as mixed ethers. Suitable representatives are methyl group-capped compounds of the formula (III) in which $R^6$ is an aliphatic, saturated, straight-chain or branched alkyl radical having 8 to 16 carbon atoms, n1 is a number from 2 to 7, m is a number from 3 to 7 and $R^7$ is a methyl group. Such compounds can be prepared readily by reacting the corresponding non-terminally capped fatty alcohol polyethylene glycol/polypropylene glycol ethers with methyl chloride in the presence of a base.

Suitable representatives of alkyl-terminally capped compounds are those of the formula (III) in which $R^6$ is an aliphatic, saturated, straight-chain or branched alkyl radical having 8 to 16 carbon atoms, n1 is a number from 5 to 15, m is 0 and $R^7$ is an alkyl group having 4 to 8 carbon atoms. The terminal capping is preferably carried out with a straight-chain or branched butyl group by reacting the corresponding fatty alcohol polyethylene glycol ether with n-butyl chloride or with tert-butyl chloride in the presence of bases.

Instead of the compounds of the formula (III) or in a mixture therewith, it is also possible for terminally capped fatty alcohol polypropylene glycol/polyethylene glycol ethers of the formula (IV) to be present. Such compounds are described, for example, in German Laid-Open Specification DE-A1-43 23 252. Particularly preferred representatives of the compounds of the formula (IV) are those in which $R^8$ is an aliphatic, saturated, straight-chain or branched alkyl radical having 8 to 16 carbon atoms, q is a number from 1 to 5, r is a number from 1 to 6 and $R^9$ is hydrogen. These are preferably addition products of from 1 to 5 mol of propylene oxide and from 1 to 6 mol of ethylene oxide onto monofunctional alcohols which have already been described as suitable in connection with the gemini surfactants.

Alkoxylated Fatty Acid Lower Alkyl Esters

Suitable alkoxylated fatty acid lower alkyl esters are surfactants of the formula (V),

$R^{10}CO{-})OCH_2CHR^{11})_w OR^{12}$ (V)

in which $R^{10}CO$ is a linear or branched, saturated and/or unsaturated acyl radical having 6 to 22 carbon atoms, $R^{11}$ is hydrogen or methyl, $R^{12}$ is linear or branched alkyl radicals having 1 to 4 carbon atoms and w is a number from 1 to 20. Typical examples are the formal insertion products of, on average, from 1 to 20 and preferably 5 to 10, mol of ethylene oxide and/or propylene oxide into the methyl, ethyl, propyl, isopropyl, butyl and tert-butyl esters of caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, elaeostearic acid, arachidic acid, gadoleic acid, behenic acid and erucic acid, and technical-grade mixtures thereof. The products are usually prepared by inserting the alkylene oxides into the carbonyl ester bond in the presence of special catalysts, such as, for example, calcined hydrotalcite. Particular preference is given to reaction products of, on average, 5 to 10 mol of ethylene oxide into the ester bond of technical-grade coconut fatty acid methyl esters.

Amine Oxides

In amine oxides which may be used are compounds of the formula (VI) and/or [lacuna].

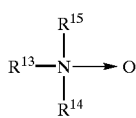

(VI)

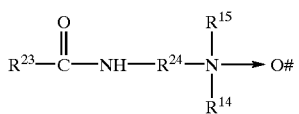

(VII)

The preparation of the amine oxides of the formula (VI) starts from tertiary fatty amines which have at least one long alkyl radical, which are oxidized in the presence of hydrogen peroxide. In the amine oxides of the formula (VI) which are suitable for the purposes of the invention, $R^{13}$ is a linear or branched alkyl radical having 6 to 22, preferably 12 to 18, carbon atoms, and $R^{14}$ and $R^{15}$, independently of one another, are $R^{13}$ or an optionally hydroxy-substituted alkyl radical having 1 to 4 carbon atoms. Preference is given to using amine oxides of the formula (VI) in which $R^{13}$ and $R^{14}$ are $C_{12/14}$- or $C_{12/18}$-cocoalkyl radicals, and $R^{15}$ is a methyl or a hydroxyethyl radical. Preference is likewise given to amine oxides of the formula (VI) in which $R^{13}$ is a $C_{12/14}$- or $C_{12/18}$-cocoalkyl radical and $R^{14}$ and $R^{15}$ have the meaning of a methyl or hydroxyethyl radical.

Further suitable amine oxides are alkylamido-amine oxides of the formula (VII), where the alkylamido radical $R^{23}CONH$ is formed as a result of the reaction of linear or branched carboxylic acids, preferably having 6 to 22, preferably having 12 to 18, carbon atoms, in particular from $C_{12/14}$- or $C_{12/18}$-fatty acids with amines. Here, $R^{24}$ is a linear or branched alkylene group having 2 to 6, preferably 2 to 4, carbon atoms and $R^{14}$ and $R^{15}$ have the meaning given in formula (VI).

The further nonionic surfactants can be present in the laundry detergents, dishwashing detergents and cleaners according to the invention in amounts of from 0.1 to 15% by weight, preferably 0.5 to 10% by weight, in particular 1 to 8% by weight, calculated as active substance, based on the compositions.

According to the present invention, the laundry detergents, dishwashing detergents and cleaners according to the invention may comprise anionic surfactants.

Anionic Surfactants

Typical examples of anionic surfactants are soaps, alkylbenzenesulfonates, secondary alkanesulfonates, olefinsulfonates, alkyl ether sulfonates, glycerol ether sulfonates, α-methyl ester sulfonates, sulfo fatty acids, alkyl and/or alkenyl sulfates, alkyl ether sulfates, glycerol ether sulfates, hydroxy mixed ether sulfates, monoglyceride (ether) sulfates, fatty acid amide (ether) sulfates, mono- and dialkyl sulfo-succinates, mono- and dialkyl sulfo-succinamates, sulfotriglycerides, amide soaps, ether carboxylic acids and salts thereof, fatty acid eisethionates, fatty acid sarcosinates, fatty acid taurides, N-acylamino acids, such as, for example, acyl lactylates, acyl tartrates, acyl glutamates and acyl aspartates, alkyl oligoglucoside sulfates, protein fatty acid condensates (in particular plant products based on wheat) and alkyl (ether) phosphates. If the anionic surfactants contain polyglycol ether chains, these may have a conventional homolog distribution, but preferably have a narrowed homolog distribution.

The anionic surfactants are preferably chosen from the group formed by alkyl and/or alkenyl sulfates, alkyl ether sulfates, alkylbenzenesulfonates, monoglyceride (ether) sulfates and alkanesulfonates, in particular fatty alcohol sulfates, fatty alcohol ether sulfates, secondary alkanesulfonates and linear alkylbenzene-sulfonates.

Alkyl and/or Alkenyl Sulfates

Alkyl and/or alkenyl sulfates, which are also frequently referred to as fatty alcohol sulfates, are to be understood as meaning the sulfation products of primary alcohols which conform to the formula (VIII)

$R^{16}O$—$SO_3X$ (VIII)

in which $R^{16}$ is a linear or branched, aliphatic alkyl and/or alkenyl radical having 6 to 22, preferably 12 to 18, carbon atoms, and X is an alkali metal and/or alkaline earth metal, ammonium, alkylammonium, alkanolammonium or glucammonium.

Typical examples of alkyl sulfates which can be used for the purposes of the invention are the sulfation products of caproic alcohol, caprylic alcohol, capric alcohol, 2-ethylhexyl alcohol, lauryl alcohol, myristyl alcohol, cetyl alcohol, palmoleyl alcohol, stearyl alcohol, isostearyl alcohol, oleyl alcohol, elaidyl alcohol, petroselinyl alcohol, arachidyl alcohol, gadoleyl alcohol, behenyl alcohol and erucyl alcohol, and technical-grade mixtures thereof which are obtained by high-pressure hydrogenation of technical-grade methyl ester fractions or aldehydes from the Roelen oxo synthesis. The sulfation products can preferably be used in the form of their alkali metal salts and in particular their sodium salts. Particular preference is given to alkyl sulfates based on $C_{16/18}$-tallow fatty alcohols or vegetable fatty alcohols of comparable carbon chain distribution in the form of their sodium salts.

Alkyl Ether Sulfates

Alkyl ether sulfates ("ether sulfates") are known anionic surfactants which are prepared industrially by $SO_3$ or chlorosulfonic acid (CSA) sulfation of fatty alcohol or oxo alcohol polyglycol ethers and subsequent neutralization. For the purposes of the invention, suitable ether sulfates conform to the formula (IX)

$R^{17}O$—$(CH_2CH_2O)_aSO_3X$ (IX)

in which $R^{17}$ is a linear or branched alkyl and/or alkenyl radical having 6 to 22 carbon atoms, a is a number from 1 to 10 and X is an alkali metal and/or alkaline earth metal, ammonium, alkylammonium, alkanolammonium or glucammonium. Typical examples of the sulfates of addition products of, on average, 1 to 10 and in particular 2 to 5, mol of ethylene oxide onto caproic alcohol, caprylic alcohol, 2-ethylhexyl alcohol, capric alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, arachidyl alcohol, gadoleyl alcohol, behenyl alcohol, erucyl alcohol and brassidyl alcohol, and the technical-grade mixtures thereof in the form of their sodium and/or magnesium salts. The ether sulfates may here have either a conventional homolog distribution or a narrowed homolog distribution. Particular preference is given to the use of ether sulfates based on adducts of, on average, 2 to 3 mol of ethylene oxide onto technical-grade $C_{12/14}$- or $C_{12/18}$-coconut fatty alcohol fractions in the form of their sodium and/or magnesium salts.

Alkylbenzenesulfonates

Alkylbenzenesulfonates preferably conform to the formula (X),

$R^{18}$-Ph-$SO_3X$ (X)

in which $R^{18}$ is a branched, but preferably linear, alkyl radical having 10 to 18 carbon atoms, Ph is a phenyl radical and X is an alkali metal and/or alkaline earth metal, ammonium, alkylammonium, alkanolammonium or glucammonium. Preference is given to using dodecylbenzenesulfonates, tetradecylbenzenesulfonates, hexadecylbenzenesulfonates and technical-grade mixtures thereof in the form of the sodium salts.

Monoglyceride (Ether) Sulfates

Monoglyceride sulfates and monoglyceride ether sulfates are known anionic surfactants which can be obtained in accordance with the appropriate methods of preparative organic chemistry. They are usually prepared from triglycerides which, optionally after ethoxylation, are esterified to give the monoglycerides and are subsequently sulfated and neutralized. It is likewise possible to react the partial glycerides with suitable sulfation agents, preferably gaseous sulfur trioxide or chlorosulfonic acid [cf. EP 0561825 B1, EP 0561999 B1 (Henkel)]. The neutralized substances can, if desired, be subjected to ultrafiltration in order to reduce the electrolyte content to a desired degree [DE 4204700 A1 (Henkel)]. Overviews relating to the chemistry of the monoglyceride sulfates are given, for example, by A. K. Biswas et al. in J.Am.Oil.Chem.Soc. 37, 171 (1960) and F. U. Ahmed J.Am.Oil.Chem.Soc. 67, 8 (1990). The monoglyceride (ether) sulfates be used for the purposes of the invention conform to the formula (XI)

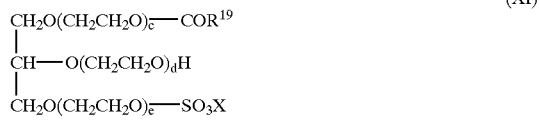

in which $R^{19}CO$ is a linear or branched acyl radical having 6 to 22 carbon atoms, c, d, and e are in total 0 or numbers from 1 to 30, preferably 2 to 10, and X is an alkali metal or alkaline earth metal. Typical examples of monoglyceride (ether) sulfates suitable for the purposes of the invention are the reaction products of lauric acid monoglyceride, coconut fatty acid monoglyceride, palmitic acid monoglyceride, stearic acid monoglyceride, oleic acid monoglyceride and tallow fatty acid monoglyceride, and ethylene oxide adducts thereof with sulfur trioxide or chlorosulfonic acid in the form of their sodium salts. Preference is given to using monoglyceride sulfates of the formula (XI) in which $R^{19}CO$ is a linear acyl radical having 8 to 18 carbon atoms.

Alkanesulfonates

Alkanesulfonates are to be understood as meaning compounds of the formula (XII)

$R^{20}$ and $R^{21}$ are alkyl radicals, where $R^{20}$ and $R^{21}$ together should not have more than 50 carbon atoms.

Expediently, the laundry detergents, dishwashing detergents and cleaners can comprise 0.01 to 20% by weight, preferably 0.25 to 15% by weight, in particular 0.4 to 10% by weight, of anionic surfactants, calculated as active substance, based on the compositions. The remainder to 100% by weight can comprise auxiliaries and additives and water.

The laundry detergents, dishwashing detergents and cleaners according to the invention can comprise, as customary ingredients or auxiliaries and additives, for example solubility promoters, such as cumenesulfonate, ethanol, isopropyl alcohol, ethylene glycol, propylene glycol, butyl glycol, diethylene glycol, propylene glycol monobutyl ether, polyethylene or polypropylene glycol ethers having molar masses of from 600 to 1,500,000, preferably with a molar mass of from 400,000 to 800,000, or in particular, butyl diglycol. In addition, abrasive substances, such as quartz or wood flour or polyethylene frictional bodies, may be present.

In many cases, an additional bactericidal action is desired, for which reason the laundry detergents, dishwashing detergents and cleaners may comprise cationic surfactants or biocides, for example glucoprotamine.

Suitable builders are zeolites, phyllosilicates, phosphates, and ethylenediaminetetraacetic acid, nitrilotriacetic acid, citric acid and salt thereof, and inorganic phosphonic acids.

Among the compounds which serve as peroxy bleaches, sodium perborate tetrahydrate and sodium perborate monohydrate are of particular importance. Further bleaches are, for example, peroxycarbonate, citrate perhydrates, and $H_2O_2$-supplying peracidic salts of peracids, such as perbenzoates, peroxyphthalates or diperoxydodecanedioic acid. They are usually used in amounts of from 0.1 to 40% by weight. Preference is given to the use of sodium perborate monohydrate in amounts of from 10 to 20% by weight and in particular from 10 to 15% by weight. The use of sodium percarbonate in combination with alkyl and/or alkenyl oligoglycosides is also preferred.

Suitable enzymes are those from the class of proteases, lipase, amylases, cellulases or mixtures thereof. Particularly suitable enzymatic active ingredients are those obtained from bacterial strains or fungi, such as *Bacillus subtilis, Bacillus lichenformis* and *Streptomyces griseus*. Preference is given to using proteases of the subtilisin type and, in particular, proteases obtained from *Bacillus lentes*. Their proportion can be about 0.1 to 6% by weight, preferably 0.2 to 2% by weight. The enzymes can be absorbed to carrier substances or be embedded in coating substances in order to protect them from premature decomposition.

In addition to mono- and polyfunctional alcohols and phosphonates, the compositions can comprise further enzyme stabilizers. For example, 0.5 to 1% by weight of sodium formate can be used. The use of proteases which have been stabilized with soluble calcium salts and a calcium content of, preferably, about 1.2% by weight, based on the enzyme, is also possible. However, the use of boron compounds, for example of boric acid, boric oxide, borax and other alkali metal borates, such as the salts of orthoboric acid ($H_3BO_3$), of metaboric acid ($HBO_2$) and of pyroboric acid (tetraboric acid $H_2B_4O_7$) is particularly advantageous.

In the case of use in machine washing processes, it may be advantageous to add customary foam inhibitors to the compositions. Suitable foam inhibitors comprise, for example, known organoolysiloxanes and/or paraffins or waxes. Foam regulators, such as, for example, soap, fatty acids, in particular coconut fatty acid and palm kernel fatty acid, may also be present.

Thickeners which can be used are, for example, hydrogenated castor oil, salts of long-chain fatty acids, which are preferably used in amounts of from 0 to 5% by weight and in particular in amounts of from 0.5 to 2% by weight, for example sodium, potassium aluminum, magnesium and titanium stearates or the sodium and/or potassium salts of behenic acid, and further polymeric compounds. The latter include, preferably, polyvinylpyrrolidone, urethanes and the salts of polymeric polycarboxylates, for example homopolymeric or copolymeric polyacrylates, polymethacrylates and, in particular, copolymers of acrylic acid with maleic acid, preferably those of 50 to 10% by weight of maleic acid. The relative molecular mass of the homopolymers is generally between 1,000 and 100,000, that of the copolymers is between 2,000 and 200,000, preferably between 50,000 and 120,000, based on the free acid. In particular, water-soluble polyacrylates which are crosslinked, for example, with about 1% of a polyallyl ether of sucrose and which have a relative molecular mass above 1,000,000 are also suitable. Examples thereof are polymers obtainable under the name Carbopol® 940 and 941. The crosslinked polyacrylates are preferably used in amounts not exceeding 1% by weight, particularly preferably in amounts of from 0.2 to 0.7% by weight.

In a further embodiment, preference is given to laundry detergents, dishwashing detergents and cleaners, in particular for automatic dishwashing machines, which comprise 0.1 to 15% by weight, preferably 0.5 to 12% by weight, of surfactants which comprise gemini surfactants of the formula (I), in particular those based on polyethylene glycol where X is a polyethylene glycol radical with a molecular weight of from 600 to 2,000, R is a linear alkyl radical having 8 to 12 carbon atoms and n is 2.

In addition, the compositions according to the invention comprise 5 to 90% by weight, preferably 10 to 80% by weight, of builders, 0.1 to 6% by weight of detergent enzyme, optionally 0.1 to 40% by weight, preferably 0.5 to 30% by weight, of bleaches and auxiliaries and additives. % by weight is to be understood as being based on the composition.

The present invention further provides for the use of gemini surfactants of the formula (I) in laundry detergents, dishwashing detergents and cleaners, in particular for the washing and cleaning of hard surfaces, preferably in the household and the industrial and institutional sector. The use in dishwashing detergents, rinse aids, bathroom cleaners, floor cleaners, cleaners in accordance with the clean shower concept (e.g. bathroom cleaners which are sprayed onto the walls and fixtures before and after showering so that the water and soap residues run off more easily, and thus dispensing with after-wiping), cockpit cleaners (car, aircraft, boat, motorcycle), window cleaners and all-purpose cleaners. Hard surfaces are, inter alia, ceramic surfaces, metal surfaces, painted surfaces, plastic surfaces and surfaces made of glass, stone, concrete, porcelain and wood.

The use of the gemini surfactants of the formula (I) according to the invention for improving the wetting behavior in laundry detergents, dishwashing detergents and cleaners, preferably on hard surfaces, in particular in machine dishwashing detergents and/or rinse aids is particularly preferred.

Also preferred is the use of gemini surfactants of the formula (I) for improving the plastics compatibility in laundry detergents, dishwashing detergents and cleaners, in particular in machine dishwashing detergents and/or rinse aids.

Also preferred is the use of gemini surfactants of the formula (I) in combination with alkyl and/or alkenyl oligoglycosides in the cleaning sectors listed hitherto.

Very particular preference is given to the gemini surfactants of the formula (I) according to the invention, optionally in combination with the other surfactants already described, for the simplified preparation of solid cleaner formulations. The gemini surfactants according to the invention can, because of their higher melting points, be incorporated more easily into laundry detergents, dishwashing detergents and cleaner formulations, in particular into solid cleaners.

In addition, preference is given to the use of gemini surfactants according to formula (I) as foam-suppressing surfactant in rinse aid formulations.

In contrast to the hydroxy mixed ethers known hitherto, the gemini surfactants according to the invention are characterized, in addition to their foam-suppressing action and the high compatibility, in particular toward plastic, by their higher melting points. As a result, they are particularly suitable for the simplified preparation of solid formulations. As a result of their higher melting points, the gemini surfactants likewise dissolve in the cleaning liquor later and develop their action in a time-delayed manner and in higher concentration. This effect can be utilized particularly advantageously in rinse aid applications.

What is claimed is:

1. A cleaning composition comprising a gemini surfactant corresponding to formula I

wherein X is a polyethylene glycol radical having a molecular weight of from about 200 to about 75,000, R is a linear or branched alkyl and/or alkenyl radical having from about 8 to about 12 carbon atoms and n is 2, and, optionally, a co-surfactant.

2. The cleaning composition of claim 1 wherein X is a polyethylene glycol radical having a molecular weight of from about 400 to about 4,000.

3. The cleaning composition of claim 1 further comprising an alkyl and/or alkenyl oligoglycoside of the formula (II)

wherein $R^1$ is an alkyl and/or alkenyl radical having from about 4 to about 22 carbon atoms, G is a sugar radical having 5 or 6 carbon atoms and p is a number from 1 to about 10.

4. The cleaning composition of claim 1 wherein the amount of the gemini surfactant is present in the composition in an amount of from about 0.01 to about 25% by weight.

5. The cleaning composition of claim 3 wherein the the co-surfactant is an alkyl and/or alkenyl oligoglycoside present in an amount of from about 0.01 to about 30% by weight.

6. The cleaning composition of claim 1 wherein the co-surfactant is a nonionic surfactant selected from the group consisting of alkoxylates of alkanols, terminally capped alkoxylates of alkanols, alkoxylated fatty acid lower alkyl esters and amine oxides.

7. The cleaning composition of claim 6 wherein the nonionic surfactant is present in the composition in an amount of from about 0.1 to about 15% by weight.

8. The cleaning composition of claim 1 wherein the co-surfactant is an anionic surfactant selected from the group consisting of an alkyl and/or alkenyl sulfate, an alkyl ether sulfate, an alkylbenzene-sulfonate, a monoglyceride (ether) sulfate and an alkanesulfonate.

9. The cleaning composition of claim 8 wherein the anionic surfactant is present in the composition in an amount of from about 0.01 to about 20% by weight.

10. A cleaning composition comprising from about 0.1 to about 15% by weight of a gemini surfactant corresponding to formula I:

wherein X is a polyethylene glycol radical having a molecular weight of from about 200 to about 75,000, R is a linear or branched alkyl and/or alkenyl radical having from about 8 to about 12 carbon atoms and n is 2,; from about 5 to about 90% by weight of a builder; from about 0.1 to about 6% by weight of a cleaner enzyme; and optionally from about 0.1 to about 40% by weight of an additive comprised of a bleach.

11. A method for improving the wetting behavior of a cleaning composition comprising adding to the composition a wetting effective amount of a gemini surfactant corresponding to formula I

wherein X is a polyethylene glycol radical having a molecular weight of from about 200 to about 75,000, R is a linear or branched alkyl and/or alkenyl radical having from about 8 to about 12 carbon atoms and n is 2.

12. A method for improving the compatibility of a cleaning composition and a plastic comprising adding to the composition a compatibility effective amount of a gemini surfactant corresponding to formula I

wherein X is a polyethylene glycol radical having a molecular weight of from about 200 to about 75,000, R is a linear or branched alkyl and/or alkenyl radical having from about 8 to about 12 carbon atoms.

13. A method for suppressing foam in a cleaning composition comprising adding a foam suppressing effective amount of a gemini surfactant corresponding to formula I

 (I)

wherein X is a polyethylene glycol radical having molecular weight of from about 200 to about 75,000, R is a linear or branched alkyl and/or alkenyl radical having from about 8 to about 12 carbon atoms and n is 2, to the composition.

14. The composition of claim 1 wherein at least 80% by weight of the gemini surfactant present in the composition is of a type wherein at least two of the hydroxyl groups on the polyol are capped with 1,2-epoxyalkane units.

15. The cleaning composition of claim 10 wherein at least 80% by weight of the gemini surfactant present in the composition is of a type wherein at least two of the hydroxyl groups on the polyol are capped with 1,2-epoxyalkane units.

16. The method of claim 11 wherein at least 80% by weight of the gemini surfactant present in the composition is of a type wherein at least two of the hydroxyl groups on the polyol are capped with 1,2-epoxyalkane units.

17. The method of claim 12 wherein at least 80% by weight of the gemini surfactant present in the composition is of a type wherein at least two of the hydroxyl groups on the polyol are capped with 1,2-epoxyalkane units.

18. The method of claim 13 wherein at least 80% by weight of the gemini surfactant present in the composition is of a type wherein at least two of the hydroxyl groups on the polyol are capped with 1,2-epoxyalkane units.

* * * * *